United States Patent
Avis et al.

(10) Patent No.: US 6,920,895 B2
(45) Date of Patent: Jul. 26, 2005

(54) COMBINATION SURGE SUPRESSION AND SAFETY SHUT-OFF VALVE

(76) Inventors: Alan Avis, 5253 Little Brush Ridge Rd., Placerville, CA (US) 95667; Brian Rodman, 9450 Roseburg Ct., Sacramento, CA (US) 95826

( * ) Notice: Subject to any disclaimer, the term of this patent is extended or adjusted under 35 U.S.C. 154(b) by 14 days.

(21) Appl. No.: 10/124,766

(22) Filed: Apr. 16, 2002

(65) Prior Publication Data

US 2002/0189679 A1 Dec. 19, 2002

Related U.S. Application Data

(60) Provisional application No. 60/284,161, filed on Apr. 16, 2001.

(51) Int. Cl.$^7$ ............................................... F16K 17/30
(52) U.S. Cl. ...................... 137/462; 137/517
(58) Field of Search ................................ 137/456, 462, 137/504, 517

(56) References Cited

U.S. PATENT DOCUMENTS

| | | | |
|---|---|---|---|
| 2,716,398 A | | 8/1955 | McMullen |
| 3,023,591 A | * | 3/1962 | Tilney ........................ 62/204 |
| 3,343,563 A | | 9/1967 | Carter, Jr. |
| 3,434,493 A | | 3/1969 | Owens |
| 3,464,439 A | * | 9/1969 | Budzich ..................... 137/504 |
| 3,568,705 A | | 3/1971 | Boyadjieff |
| 4,590,962 A | | 5/1986 | Tespa |
| 4,674,526 A | | 6/1987 | Athanassiu ................. 137/113 |
| 4,880,030 A | | 11/1989 | Terry |
| 5,085,246 A | | 2/1992 | Griinke ....................... 137/504 |
| 5,215,113 A | | 6/1993 | Terry |
| 5,265,643 A | * | 11/1993 | Golestan et al. ............ 137/504 |
| 5,381,822 A | | 1/1995 | Christensen ................ 137/460 |
| 5,551,476 A | | 9/1996 | McGinnis .................... 137/517 |
| 6,019,115 A | | 2/2000 | Sanders ....................... 137/517 |
| 6,123,101 A | | 9/2000 | Velie et al. .................. 137/517 |

* cited by examiner

Primary Examiner—Stephen M. Hepperle
(74) Attorney, Agent, or Firm—John P. O'Banion

(57) ABSTRACT

A surge suppressor and safety shut-off valve is described which automatically shuts off fluid flow in response to a sufficient pressure differential across the valve. The shut-off valve comprises a valve body adapted for use within a fluid distribution system through which a predetermined flow of a fluid is nominally allowed to pass. A flow restricting means is disposed therein that reduces the maximum flow when triggered by a sufficient pressure differential between inlet and outlet. By way of example, the flow restricting means is preferably provided by a poppet which is slidably engaged within the valve chamber to restrict fluid flow therethrough. The poppet is preferably adapted with a very low volume bypass port through which opposing pressures at valve inlet and outlet may be equalized for automatically resetting of the valve after the surge has passed, or a rupture has been repaired.

12 Claims, 17 Drawing Sheets

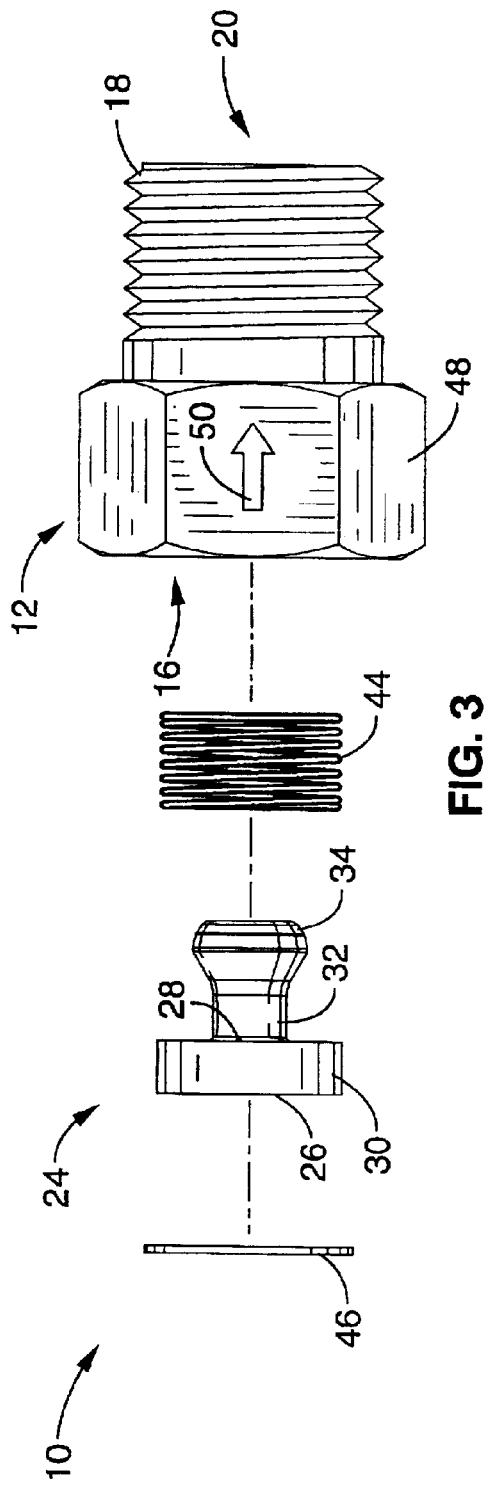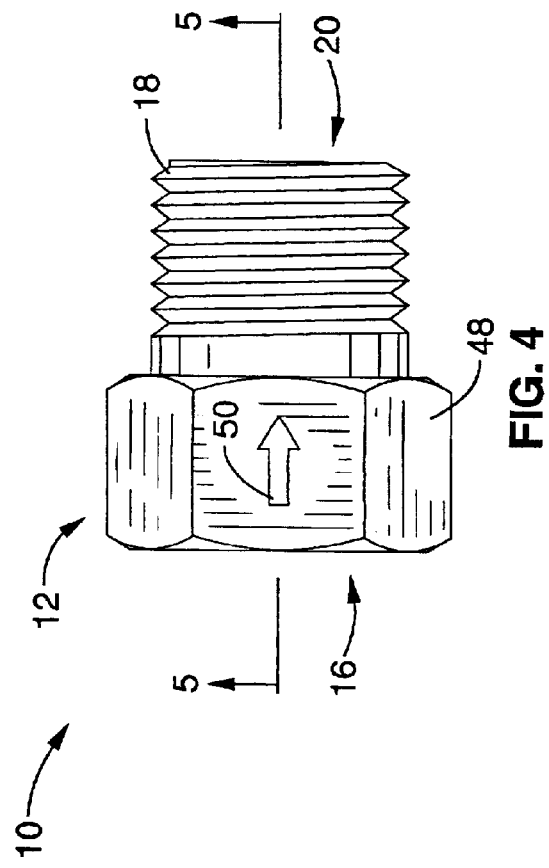
FIG. 3
FIG. 4

COMBINATION SURGE SUPRESSION AND SAFETY SHUT-OFF VALVE

CROSS-REFERENCE TO RELATED APPLICATIONS

This application claims priority from U.S. provisional application Ser. No. 60/284,161 filed on Apr. 16, 2001, incorporated herein by reference.

STATEMENT REGARDING FEDERALLY SPONSORED RESEARCH OR DEVELOPMENT

Not Applicable

REFERENCE TO A COMPUTER PROGRAM APPENDIX

Not Applicable

BACKGROUND OF THE INVENTION

1. Field of the Invention

This invention pertains generally to gas flow surge suppressors and safety shut-off valves and more particularly to a combination surge suppressor and safety shut-off valve that preferably allows for automatic restoration of nominal fluid flow, a reset, after engagement of the safety shut-off valve.

2. Description of the Background Art

Catastrophic events, such as earthquakes, floods or similar events, can compromise distribution systems, such as the rupture of pipelines carrying liquids or gasses to residential and commercial structures. The typical liquids and gases being distributed for residential use are water, and combustible substances, which may comprise combustible gasses (i.e. hydrocarbons such as methane, pentane, or natural gas), or combustible liquids (i.e. fuel oil, gasoline, diesel fuel, and so forth). It will be appreciated, however, that pipelines may carry any number of liquid or gaseous substances, such as for distribution within an industrial plant.

The rupture of water pipelines caused by a catastrophic event (natural or man made) may result in additional damage being wrought on structures and property. However, it will be appreciated that when the substance being distributed is volatile, or otherwise poses a danger to persons and property, the damage caused by a rupture may be increased by orders of magnitude. For example, the fluidic substance may comprise combustible, corrosive, poisonous, radioactive, or similarly potentially dangerous substances. The majority of dangerous pipeline ruptures occur in pipelines carrying combustible substances, such as hydrocarbon gases, which can rupture to create a substantial risk of explosion or asphyxiation. In addition, ruptures in pipes carrying combustible substances can pose a significant danger to emergency and rescue personnel as well as others.

The safety of any system which distributes fluidic substances, either gaseous or liquid form, can be enhanced by the placement of shut-off valves (also referred to as cut-off valves, safety valves, surge relief valves, and so forth) at appropriate locations in the distribution system that will automatically shut off the flow of the fluidic substance when a downstream rupture occurs in the system. Additionally, in a residential setting, the shut-off valve is typically placed on the low-pressure end of a regulator unit that is attached to the gas source, such as a pressure regulating associated with a gas meter. The shut-off valve serves to interrupt the flow of gas in the event of regulator failure, or if a catastrophic failure in the downstream portion of the distribution system occurs, such as a rupture.

In addition, surge conditions arise in fluid distribution systems that may disrupt associated equipment or create increased risk of injury or property damage. For example, consider a natural gas distribution pipeline that connects to a stove having a pilot light. Surges in gas pressure can "blow out" the pilot light, requiring it to be relit. It is preferred therefore that a fluid distribution system provide a predetermined pressure with minimum fluctuation for proper operation of the equipment attached thereto.

Many of the fluidic shut-off valves known in the art comprise a ball or a piston that is positions it self against a seat in response to sensing a difference in pressure across the valve between the upstream line and the downstream line. These valves operate in one of two positions, a nominal flow "on" position wherein fluid can flow through the valve, and an "off" state triggered by a pressure differential. When triggered into the "off" position, these valves are designed to completely prevent fluid flow through the valve.

One significant drawback of these conventional shut-off valves is that once they are triggered into an "off" state it is difficult to restore nominal fluid flow. For example, to restore flow through a gas shut-off valve, the gas line must be de-pressurized and the valves either replaced or manually reset. The time and labor required to restore fluid flow can be particularly costly when the valves are not easily accessible, such as when they are located in walls, ceilings, floors, or are submerged in water or buried beneath the soil.

The costs involved in restoring normal flow can be exorbitant, in particular when it is considered that these valves often get triggered into their "off" state without being subjected to a catastrophic event. Sudden pressure surges in fluid distribution systems such as gas pipelines are common. Pressure changes of sufficient magnitude may "trigger" a conventional shut-off valve into its closed (off) position. These valves, once triggered into an "off" state, must be either replaced or manually reset, depending on design, despite the lack of a significant, or catastrophic, event and even though there has been no damage or failure within the distribution system.

Accordingly, there is a need for a safety shut-off valve, also often referred to as a surge relief valve, safety valve, or shut-off valve, in which nominal fluid flow, in particular gaseous flow, can be more readily restored. The present invention satisfies that need, as well as others, and overcomes the deficiencies of previously developed safety valves.

BRIEF SUMMARY OF THE INVENTION

The present invention provides a combination surge suppression and safety shut-off valve for controlling the flow of gas, vapor, or fluid through a distribution system and preventing hazardous uncontrolled release thereof. The combination surge suppressor and shut-off valve according to the invention, which will be referred to generally as a shut-off valve, provides a low cost, accurate apparatus for reducing surge intensity within a fluid distribution system and for shutting off fluid flow in response to distribution system ruptures, or similar pressure drops that occur downstream of the shut-off valve.

The time and cost involved in "resetting" a conventional shut-off valve has been appreciated within embodiments of the present invention which solve this long-standing deficiency of shut-off valves by automating the valve reset operation. Although the present valve has application for gas and liquid flow control, the depicted embodiment are described for use in a gas distribution system.

Conventional gas shut-off valves are designed to completely stop fluid flow upon being triggered, to an "off" state, by an event which creates enough pressure differential across the valve. However, within the present invention it has been recognized that by completely preventing all fluid flow, the disparate pressure across the valve at the point of triggering the shut-off valve into an "off" state, wherein insignificant fluid communication occurs across the valve, and the pressure difference is thus maintained. The present invention thereby does not (1) mechanically latch itself into an "off" state upon detecting a sufficient pressure differential, and furthermore (2) provides a bypass port through which a meager amount of gas (fluid) may pass when the valve is otherwise closed to provide for equalization of static pressures over a period of time so that the valve may automatically reset itself.

The shut-off valves of the present invention are suited for use within any fluidic distribution system. Traditionally, due to the danger associated with a rupture, safety shut-off valves are incorporated within distribution systems for combustible fluidic substances, such as combustible gases of hydrogen, hydrocarbons (methane, ethane, propane, natural gas), combinations thereof, and so forth. Furthermore, the combustible fluidic substances may be partially, or fully, comprising combustible liquids, such as a hydrocarbon in the form of a petroleum distillate (diesel fuel, gasoline, Jet-A), and other combustible liquids.

The combination surge suppression and safety shut-off valve of the present invention may be utilized in numerous applications. In the case of a combustible gas distribution system, or network, the invention by way of example may be utilized on gas pipes that exit a meter or other gas monitoring or control apparatus, and lead into a home or business. The gas shut-off valve may be utilized on pipes, or flexible hoses, that lead into a single appliance, such as a heater, stove, oven, barbecue, fireplace lighting system, pool heaters, and other similar appliances that operate from combustible gas. Damage to the appliance which leads to a pipe rupture will then be prevented from creating a dangerous leakage situation. It will be appreciated that other devices operating from combustible gasses may incorporate the gas shut-off valve. Even new devices which rely on receiving a fluidic substance, such as fuel cells, may beneficially incorporate a shut-off valve according to the present invention, albeit typically implemented on a smaller scale, to prevent unrestrained gas leakage in the case of damage to a downstream fuel pathway.

In general, the combination surge suppression and shut-off valve of the present invention provides a shut-off valve for restricting the flow of a fluid (fluidic substance) through a distribution system in response to pressure changes therein. The safety shut-off valve comprises a valve body adapted for connection within a fluidic distribution system. The valve body is adapted with an inlet port and an outlet port through which fluid is nominally allowed to pass and a flow restricting means that reduces the flow upon being triggered by a sufficient pressure differential across the valve. The flow restricting means may be configured to substantially prevent any fluid flow in the off position, or to more preferably limit the fluid flow in the off position to a safe second flow rate that allows the pressure to equalize across the valve within a reasonable period of time, wherein the valve can automatically reset to an "on" state which allows a nominal fluid flow. Automatic resetting of the valve is preferably achieved by incorporating a flow bypass port within the valve chamber that provides for equalizing the pressure across the valve so that the state of the valve can be automatically restored to an "on" state to allow for nominal flow.

In accordance with the present invention the shut-off valve comprises a valve body (or housing) that is preferably tubular, with one end forming an inlet (input) port and a second end forming an outlet (output) port, with the interior of the body forming a valve chamber through which gas is allowed to flow. The valve body is preferably sized to fit conventional fluid distribution systems, such as by connecting with pipelines of conventional dimensions and threading, for instance half inch pipes, three quarter inch pipes, and one inch pipes, or other conventional pipelines. Although typically a single inlet and outlet port exist, it should be appreciated that ganged valves and multi-port valves (input or output) may be implemented without departing from the teachings of the present invention. Preferably, the fluid coupling comprises the incorporation of threaded couplers on the exterior or interior of the valve body to provide for simplified connection with conventional pipeline fluid distributions systems. In one embodiment, the cylindrical body has one set of exterior threads on one end and an interior set of threads on the other end of the body creating a female-male connection, which facilitates insertion within an existing run of pipeline. In a second embodiment, the cylindrical body has the same type of threads on both ends of the cylindrical body, for example the second embodiment is depicted having exterior threading to create a male-male fluidic connection.

The safety shut-off valve of the present invention utilizes a flow restricting means that reduces the maximum flow of fluid from a nominal first rate of flow to a predetermined second rate of flow if a sufficient pressure differential arises between the inlet port and the outlet port of the shut-off valve. Less preferably, the flow restricting means substantially prevents all fluid flow across the valve when triggered into an "off" state position. The flow restricting means within the safety shut-off valve undergoes a physical movement in response to the pressure differential between the input and output ports to restrict fluid flow as the input pressure sufficiently exceeds the output pressure. In the case of a sufficient rupture on the output side of the valve, downstream direction, the flow restricting means moves to a position of maximum flow restriction.

In a preferred embodiment of the present invention this maximum flow restriction still provides for a very small amount of fluid to pass from the input port to the output port, which is referred to as a bypass flow. This minimum, bypass flow of fluid is preferably set for a predetermined flow level, in relation to the nominal operating pressure of the upstream side, so that no danger is posed from the small quantity of fluid which may be released if a rupture has in fact occurred in the downstream side of the distribution system. If, however, the pressure differential was caused by a transient condition in the fluid distribution system, then the pressures in the upstream and downstream sides of the valve will be readily equalized and the valve will automatically return to an "on" state thereby restoring the normal open state of the valve whereby nominal fluid flow may be achieved. It will be appreciated that failures in the downstream side of the distribution system, such as a rupture or significant leakage, are generally readily repaired to restore the use of equipment relying on the fluid. After reparations restore the integrity of the downstream side, the pressure therein will steadily rise over a period of time by virtue of the small bypass flow through the otherwise closed valve. When the pressure differential is sufficiently reduced, the flow restricting means returns to an "on" state condition wherein nominal fluid flow may again occur. This ability to automatically reset itself after either pressure transients, or downstream pipeline repairs, can reduce the maintenance costs associated with a fluid distribution system, or network.

Although it may be implemented in a number of ways evident to one of ordinary skill in the art, the flow restricting means is preferably implemented in the form of a poppet member whose position is slidably disposed within the valve chamber in the interior of the tubular cylindrical body. A biasing member in contact with the poppet provides a force which urges poppet away from the valve seat, toward an "on" state position. The poppet is generally cylindrical with a head, neck and poppet body and is configured to slide in either direction within the valve chamber of the cylindrical body. The head of the poppet is attached by way of the neck to the base portion of said poppet, which is configured for slidable engagement within the valve body. A portion of the head is preferably enlarged, beyond the cross-sectional area of the neck, to increase the area within the base of the poppet through which flow apertures may reside and to control fluid flow through the valve. The head of the poppet preferably has a plurality of precisely beveled edges that are configured for engaging a valve seat with similarly beveled edges formed in the interior of the valve chamber. It should be appreciated that the head of the poppet may, depending on relative pressures, reach a position proximal to valve seat to restrict the fluid flow without actually engaging the valve seat. For example, in the case of a small surge, the poppet may move a short distance from its full "on" position towards the valve seat and a closed position, overcoming the force of the biasing member, which results in restricting fluid flow and thereby reducing the surge pressure on the downstream side of the valve. Poppet movement is also subject the relative pressures that exist on either side of the poppet. Therefore, the biasing force from the biasing member can be overcome when the pressure at the inlet exceeds the pressure at the outlet by a sufficient amount, wherein the poppet moves toward the valve seat to restrict fluid flow. A sufficient pressure differential results in the poppet fully engaging the valve seat, such that the maximum flow through said valve is then determined by the bypass configuration of the safety shut-off valve of the present invention.

Preferably, a coiled spring is utilized for biasing the poppet away from the valve seat, although other biasing mechanisms may be utilized without departing from the teachings of the present invention as claimed. The poppet is thereby biased away from the valve seat under normal fluid flow conditions, wherein the valve is totally passive allowing the fluid to flow around the poppet and through the valve chamber. Nominal flow may occur until such time as the pressure differential across the valve exceeds the opposing bias force of the spring. The poppet and associated spring may be produced to high tolerances to reduce the variation in operating points with regard to the pressure differentials which cause opening and closing of said valve. Furthermore, any variation may be further alleviated by matching poppet weight to the constant of the spring.

Poppet motion is restricted in the direction away from the valve seat by a mechanical stop, which may be implemented in a number of ways. In one embodiment, this mechanical stop is provided at the far end of the valve chamber with a snap ring.

The base of the poppet is slidably engaged with the interior of the valve chamber, and a number of flow apertures are provided in the base for allowing fluid to flow through the poppet and out of the valve seat and associated output port. These flow apertures are preferably configured as a series of bores equally distributed about the base, such as in a circular pattern. It will be appreciated, however, that the apertures may be implemented in other ways without departing from the present invention, such as by providing apertures in the form of notches in the perimeter of the base of the poppet. The neck, or necked down portion, of the poppet extending from the base provides additional area in the base that may be configured with flow apertures, and furthermore provides for controlling the fluid flow pattern in said valve to reduce flow to aid valve operation while controlling the amount of pressure drop that occurs across the valve.

Preferably, the cross sectional area of the apertures and their shape determine the amount of flow allowed through the shut-off valve for a given pressure. The same valve body design may thereby be used with poppets having different bores sizes, and/or shapes, to support any number of allowable flow rates. By "matching" the nominal flow rate to the application, downstream failures of the fluid distribution system, such as ruptures, may be detected with more precision. It will be appreciated that the nominal flow rate, for a given pressure, can be controlled by modulating alternative aspects of the valve design, such as the size of the opening within the valve seat, although changing these other aspects of the design may require additional customization per supported nominal flow rate. Furthermore, the present valve may be adapted to provide an adjustable nominal flow rate by controlling the amount of flow restriction inherent in the shut-off valve, or by including an additional controllable flow restriction means, such as a conventional flow restrictor. It should be appreciated, however, that non-uniform fluid flow through the valve may negatively effect correct poppet operation.

The bypass flow within the shut-off valve is preferably provided by a small bore centrally located through the neck and head portions of the poppet that directs a small amount of fluid flow from the base of the poppet facing the inlet port through a passageway, or passageways, in the poppet and then through the opening in the valve seat to exit the outlet port of said shut-off valve. This small bore forms a flow bypass that allows the pressure differential to equilibrate across the shut-off valve, unless a rupture exists downstream of the valve, whereupon the poppet moves away from the seat automatically to restore the "on" state of the valve which allows for nominal flow through the valve. The maximum amount of fluid flow through the bypass port is preferably in the range from approximately 0.001% to 0.5% percent of the nominal fluid flow through the valve at a given pressure, and more preferably not exceeding approximately 0.001 SCFH (Standard Cubic Feet Per Hour) to approximately 10 SCFH. A portion of the passageway, or passageways, may be "necked down" to a reduced diameter section prior to exiting the distal end of the poppet, toward the valve seat, for controlling the flow rate. It will be appreciated that a number of variations in the structure of the bypass port may be implemented by one of ordinary skill in the art without departing from the teachings of the claimed invention. By way of example and not of limitation the bypass port may be rendered in a number of alternative ways.

An object of the invention is to provide a safety control valve that actuates automatically upon a change in line pressure between the intake line and the output line over a predetermined amount.

Another object of the invention is to provide a safety control shut-off valve that is capable of resetting itself automatically after repairs have been made to a line rupture.

A further object of the invention is to provide a safety control shut-off valve that is capable of remaining closed after repairs have been made to a line rupture if a secondary leak went undetected.

Another object of the invention is to provide a safety control shut-off valve that is easy to install in existing systems as well as new systems.

Still another object of the invention is to provide a safety control shut-off valve that is reliable and operates no matter what causes the line break.

Another object of the invention is to provide a safety control shut-off valve that can dampen pressure fluctuations of the fluid in the pipeline thereby avoiding surges at the point of use.

Another object of the invention is to provide a safety control shut-off valve having a predetermined nominal flow rate under given pressure conditions.

Another object of the invention is to provide a safety control shut-off valve that selectively adjusts the nominal flow rate for a given pressure.

Another object of the invention is to provide a safety control shut-off valve incorporating pressure regulation.

Another object of the invention is to provide a safety control shut-off valve that will eliminate the uncontrolled release of fluids from a fluid distribution system, such as occurring as a result of a man-made or natural catastrophic event, and ameliorate the attendant risks of fire, explosion, water damage, and so forth.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 3 is an exploded side view of the combination surge suppression and safety shut-off valve of the present invention as shown in FIG. 2.

FIG. 4 is an assembled side view of the combination surge suppression and safety shut-off valve of the present invention as shown in FIG. 3.

DETAILED DESCRIPTION OF THE INVENTION

Referring more specifically to the drawings, for illustrative purposes, the preferred embodiments of the present invention will now be described with reference to FIG. 1 through FIG. 25. It will be appreciated that the invention may vary as to configuration and as to details of the parts without departing from the basic concepts as disclosed herein.

Figure 1:
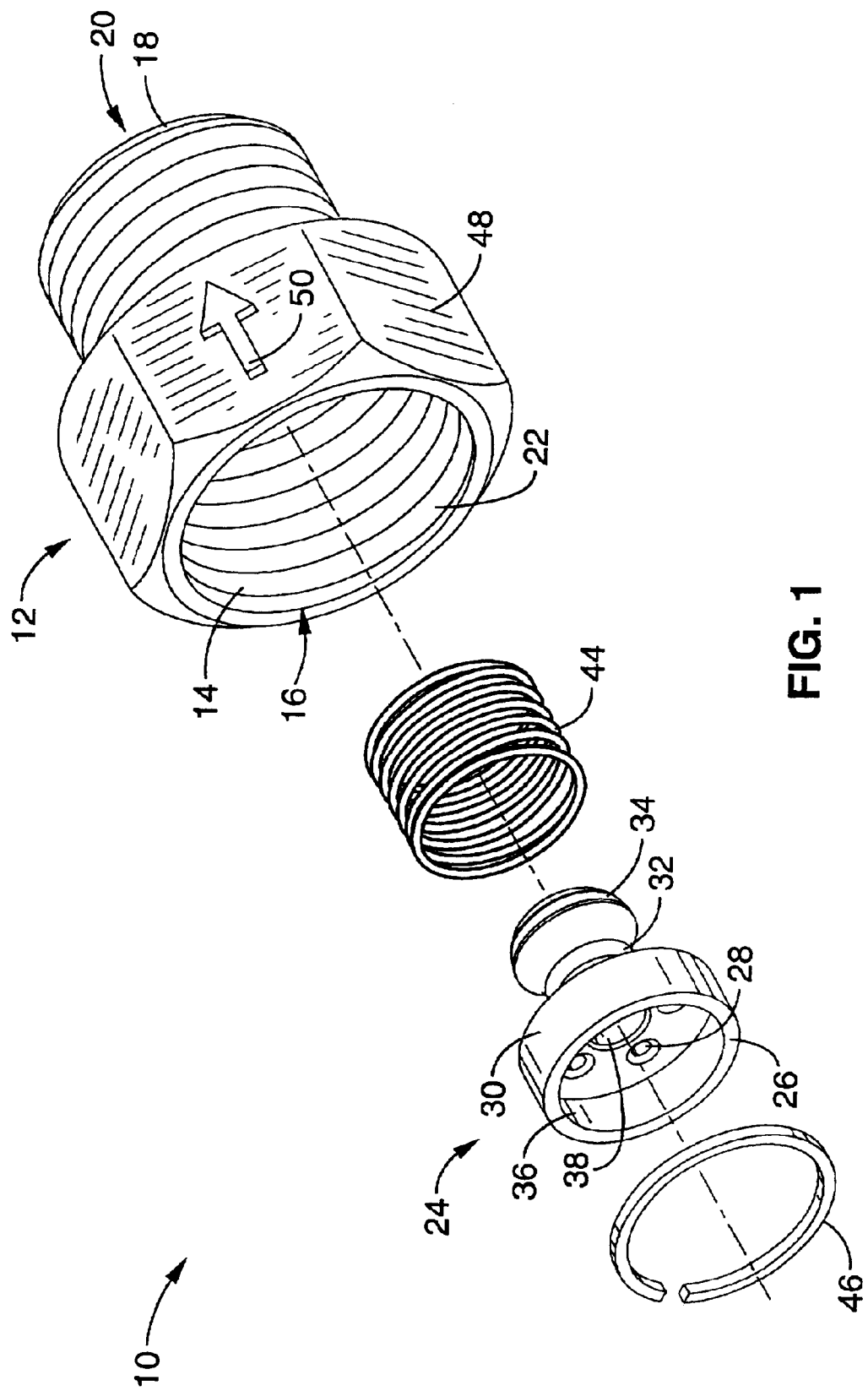
FIG. 1 is an exploded perspective view toward the inlet of the combination surge suppression and safety shut-off valve according to an embodiment of the present invention shown implemented with female-male connections.
Figure 2:
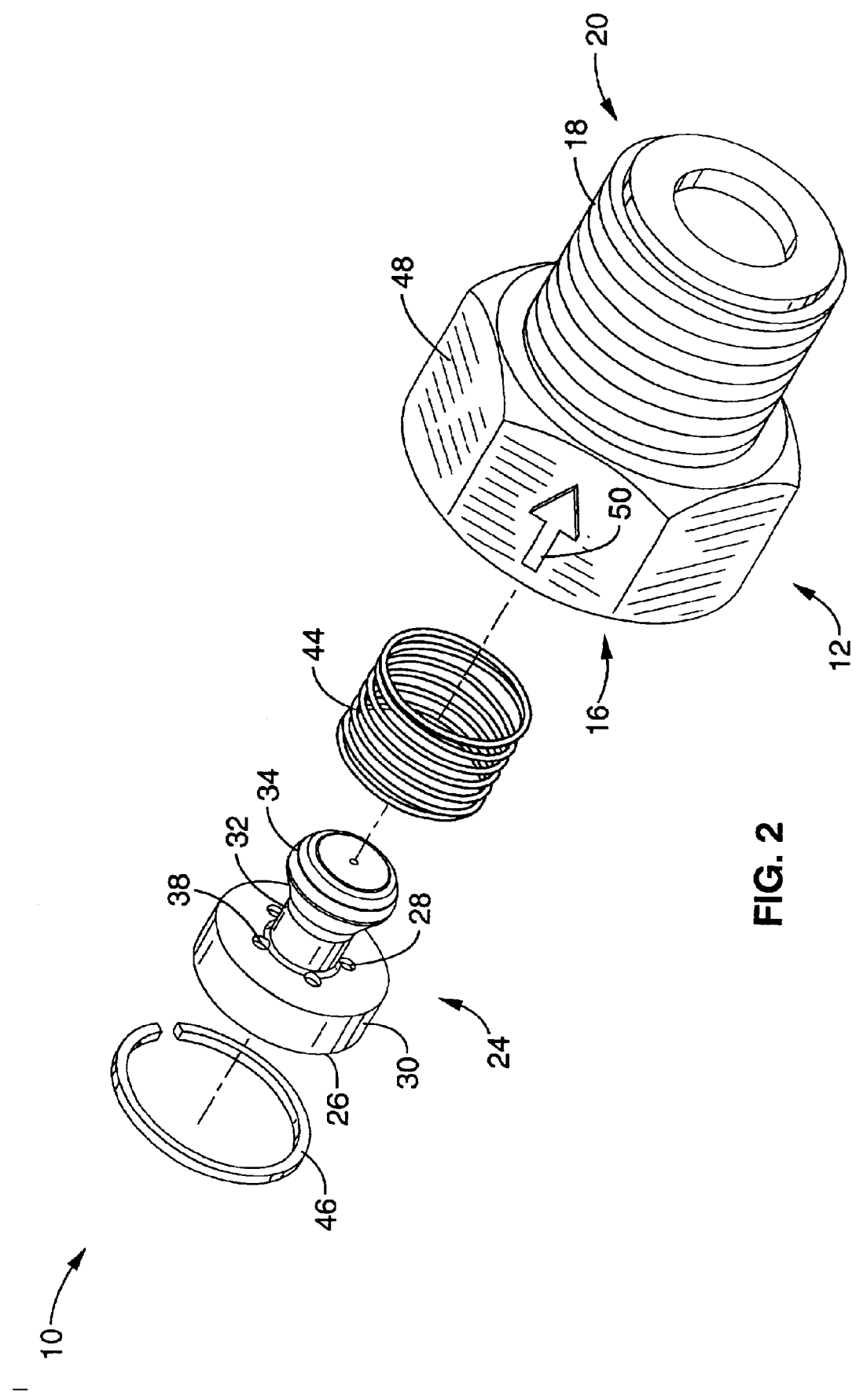
FIG. 2 is an exploded perspective view toward the outlet of the shut-off valve shown in FIG. 1.

FIG. 1 and FIG. 2 depict a combination surge suppressor and safety shut-off valve 10 configured with female-male connections for incorporation within a gas distribution system according to an embodiment of the present invention. A valve body 12 is shown having a generally tubular design. Valve body 12 has inlet connector 14 shown as a female threaded section on the inlet port 16 of the valve body, while an outlet connector 18 is shown on the outlet port 20 of the valve body. A valve chamber 22 within valve body 12 is configured to receive a flow restriction means that is responsive to pressure. Valve chamber 22 is shown receiving a poppet member 24, having a proximal end base 26, flow apertures 28, perimeter of base 30 providing an interface with the walls of valve chamber 22 when poppet member 24 is slidably engaged therein. Extending from base 26 is a neck 32, also generally referred to as a shaft, or stem, which terminates at a distal end having an enlarged head 34 which is preferably precisely shaped for engaging a valve seat (not shown) within valve body 12. A recess 36 in base 26 of poppet 24 forms a reservoir that receives incoming flow prior to it passing through flow apertures 28 toward outlet port 20. A bypass passageway 38 is depicted into which a small quantity of fluid may flow through the poppet to equalize the pressure across the shut-off valve. Bypass passageway 38 leads to a flow restricted section, such as a narrowed aperture, (not shown) prior to exiting a bypass output 42 in the head of poppet 24 which is directed through the valve seat. A biasing member 44, such as a coiled spring, operates to urge poppet 24 to maintain separation from the valve seat so that nominal gas flow may be provided through gas shut-off valve 10. A retention member 46, such as a retention ring or snap ring, is shown for insertion within the interior of valve body 12 to retain poppet 24 within valve body 12 and to limit the extent of its movement therein. By way of example, the exterior of valve body 12 is shown configured having a preferred conventional hex outer perimeter 48 to facilitate threading the present combination surge suppressor and shut-off valve 10 into a distribution system, such as by the use of open end wrenches. The direction of gas flow is indicated by a direction indicia, graphics, or text, 50 such as by an arrow.

Upon sensing a pressure differential greater than what the valve has been calibrated to, the shut-off valve will be activated by the pressure differential and will shut off the flow of gas. The flow will remain closed until all the repairs to the dispensing system downstream of the valve have been made and will then automatically reset allowing nominal gas flow to be resumed. In particular, under normal operating conditions the valve is open with the poppet biased away from the valve seat by a biasing member wherein a nominal first flow rate of gas may pass through shut-off valve 10. Poppet 24 and spring 44 in combination with the valve seat create a flow restricting means that reduces the gas flow in response to the pressure differential which exists between inlet port 16 and outlet port 20. If a sufficient pressure differential exists, then poppet 24 is driven within valve chamber 22 by the higher inlet pressure to fully engage the valve seat and close the valve. A bypass path provides a secondary flow path, such that when the valve is closed a small predetermined second flow of gas can occur between the inlet and outlet of the valve to equalize the pressures across the shut-off valve.

Poppet 24 is a critical component in the valve design and it performs multiple tasks. In particular, poppet 24 has been engineered to shut off the flow of gas in the event the downstream demand for gas exceeds the demand calibrated for the valve, whereupon the higher relative upstream pressure closes the valve. A second task of the poppet is to dampen the effect of abrupt pressure changes in the line. It will be appreciated therefore, that the weight of poppet 24 is important, particularly in relation to the timing of surges and their proper suppression. Poppet 24 may be matched by weight to a corresponding biasing member, such as a spring, to achieve the desired pressure differential trigger, activation, setting. By matching the spring and poppet correctly, it is possible to control the flow of gas downstream from the placement of the valve in the system. It should be noted, that often a weaker than normal spring can be balanced out by using a larger than normal flow bore. Poppet member 24 may incorporate a recessed portion 36 facing the inlet port which forms a reservoir within base 26. The walls of the recessed portion on the underside of the base may be beveled, or otherwise shaped. Flow apertures 28, also referred to as bores or slots, through base 26 of poppet 24 determine the nominal quantity of gas that can flow through the valve.

The valve body may be fabricated from any sufficiently durable material, such as plastics, and more preferably metals. The valve body is more preferably fabricated using conventional techniques from a brass material, or a similar alloy. Poppet 24 is preferably manufactured from a polymeric material, preferably a copolymer, which is most preferably a copolymer such as Celcon M90 or the like. Celcon M90 is lubricious, and has a high tensile strength while having the ability to maintain structural integrity through the manufacturing process. Underwriters Laboratories and the Canadian Standards Association have tested M90, approving and certifying its use with natural gas, propane, and mixed gases.

FIG. 3 and FIG. 4 are additional views of the surge suppressor and shut-off valve of FIG. 1 and FIG. 2, shown prior to assembly in FIG. 3, and assembled in FIG. 4.

Figure 6:
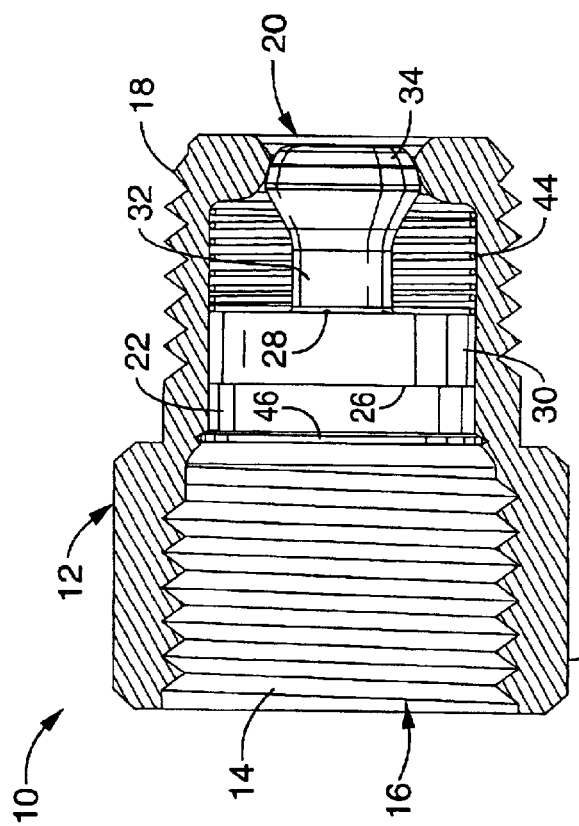
FIG. 6 is a cross-section of the valve housing within the combination surge suppression and safety shut-off of FIG. 5, depicting the valve in an "off" position.
Figure 5:
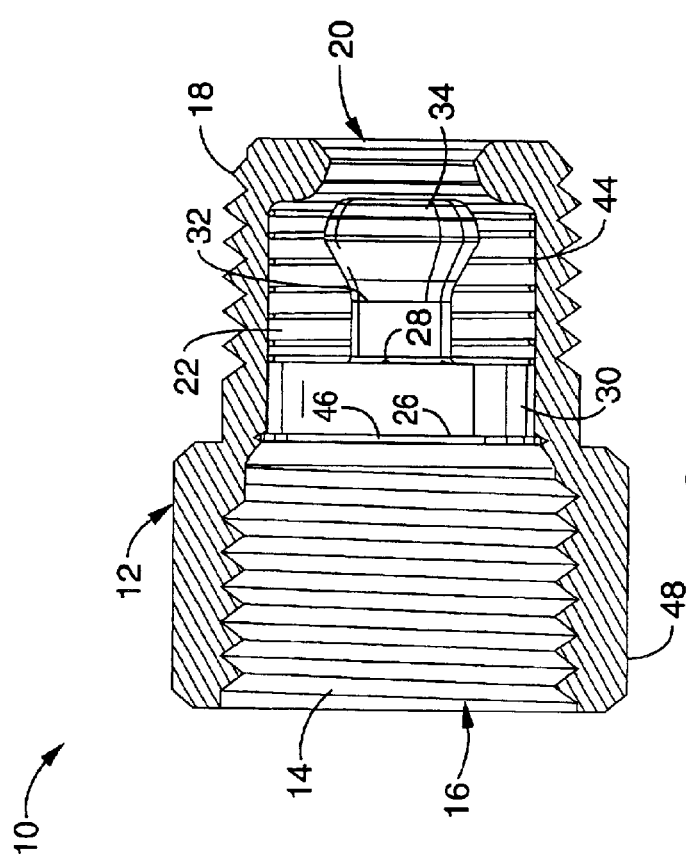
FIG. 5 is a cross-section of the valve housing within the combination surge suppression and safety shut-off of FIG. 4, depicting the valve in an "on" position wherein nominal flow may be established through the safety valve.

FIG. 5 and FIG. 6 illustrate the safety shut-off valve of FIG. 4 shown in an "on" and "off", closed, position respectively.

Figure 8:
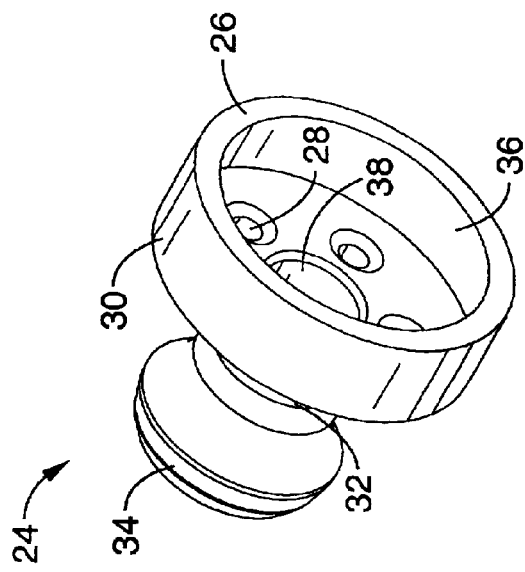
FIG. 8 is a perspective view from the base of the poppet of FIG. 7, showing the tapered bores through the base section of the poppet and recessing of the underside of the base member according to an aspect of the present invention.
Figure 9:
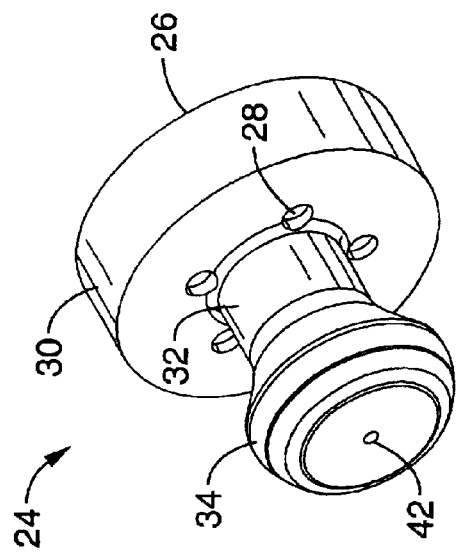
FIG. 9 is a perspective view from the head of the poppet neck of FIG. 8, showing the beveled end and a bypass port according to an aspect of the present invention.
Figure 7:
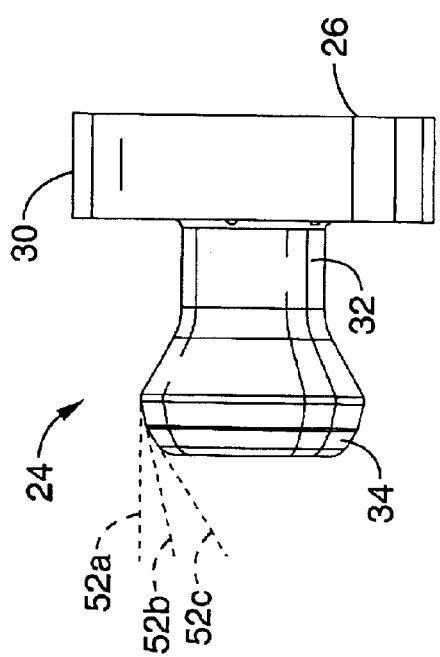
FIG. 7 is a side view of the poppet of FIG. 6, showing the triple beveled valve seat interface at the head of the poppet.

FIG. 7 through FIG. 9 depict views of poppet 24. It can be seen that poppet 24 is designed with a triple beveled 52a, 52b, 52c, head 34. The beveling, and radiusing between respective bevels, provides for a secure interface with the valve seat, typically engaging a single bevel, and minimizes dynamic flow resistance for a given cross-sectional flow path. Base 26 is shown having a large recess 36, providing a reservoir in base 26 of poppet 24.

Figure 10:
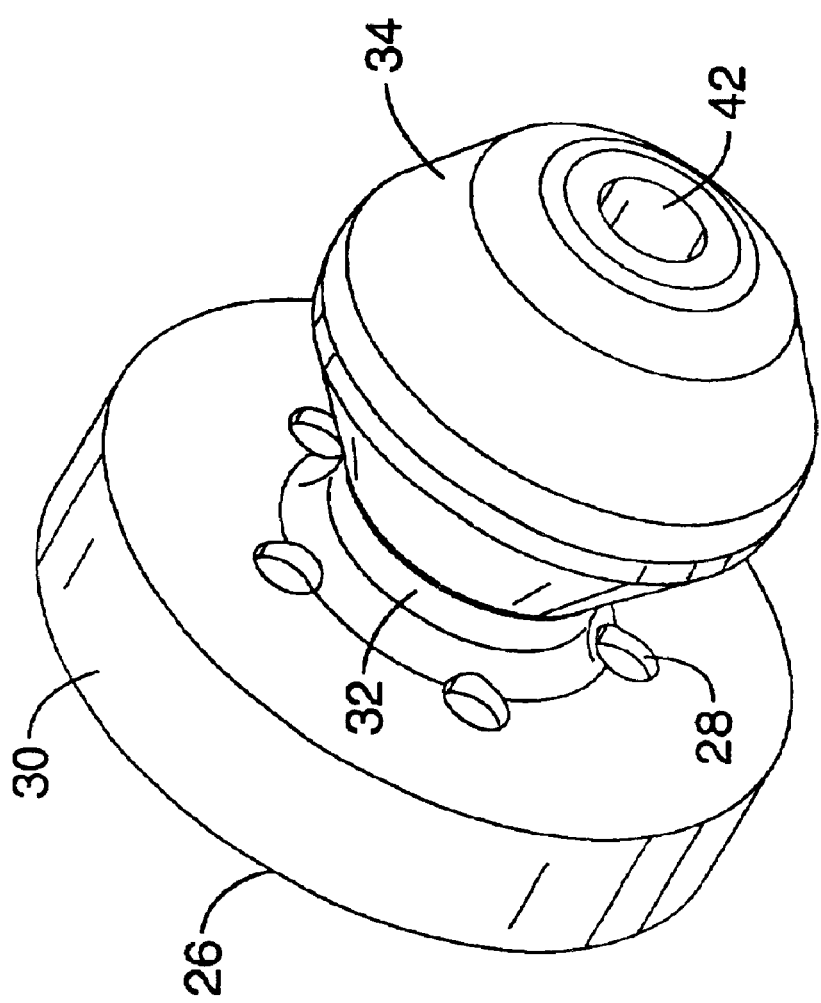
FIG. 10 is a perspective view of an alternative embodiment of a short poppet according to an aspect of the present invention.
Figure 12:
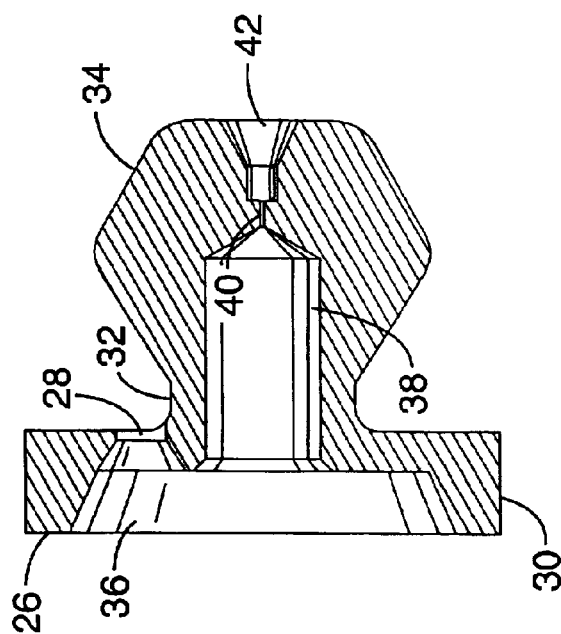
FIG. 12 is a cross-section of the short poppet of FIG. 11, showing flow passageways.
Figure 11:
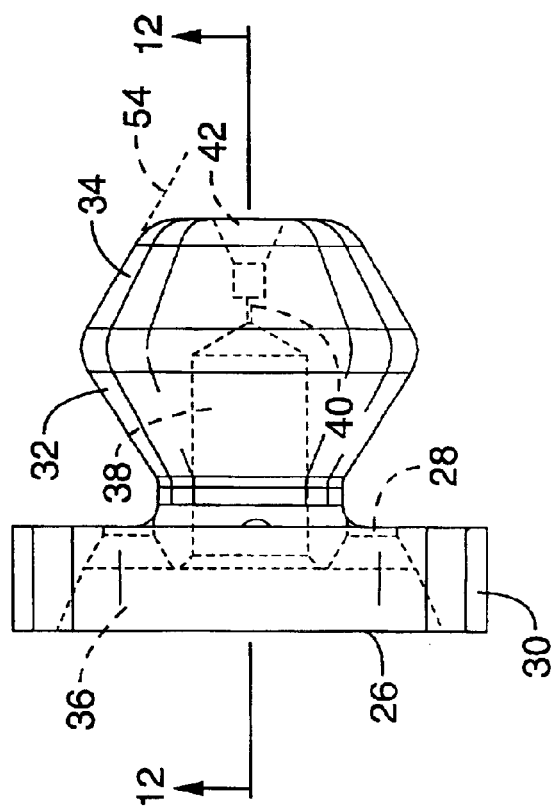
FIG. 11 is a side view of the short poppet of FIG. 10, shown with a single-beveled valve seat interface.

FIG. 10, FIG. 11, and FIG. 12 exemplify an alternative embodiment of a short poppet 24 that may be used utilized within a valve body 12 according to the present invention. Varying the length of poppet 24 for a given valve chamber 22 stroke length can provide a method of altering the pressure thresholds of the valve and/or control the flow rate control dynamics through the shut-off valve. The short poppet is also particularly well suited for use on smaller diameters of pipe, such as one half inch pipe.

Figure 13:
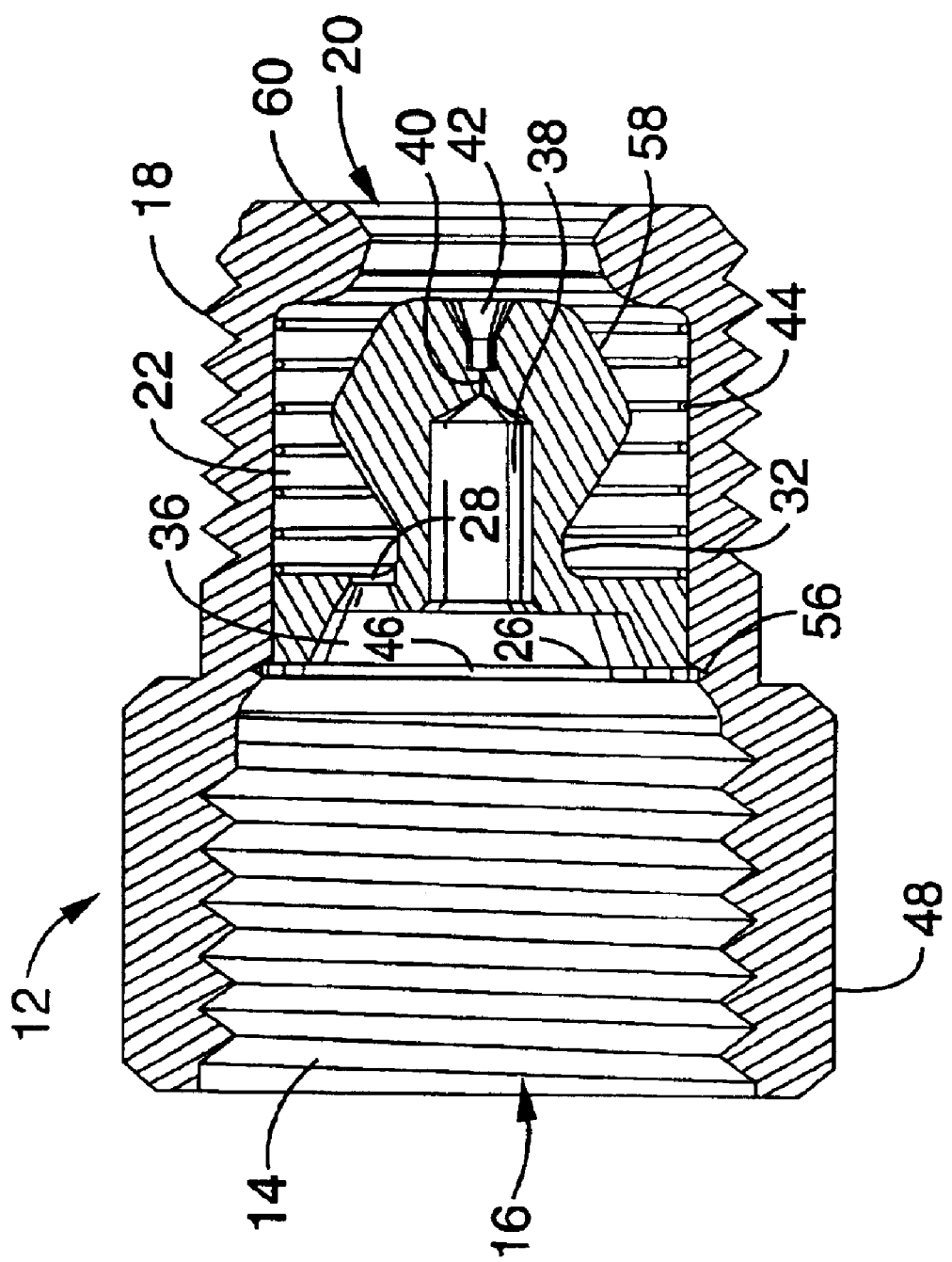
FIG. 13 is a cross-section of a combination surge suppression and safety shut-off valve using the short poppet of FIG. 12 depicting the valve in an "on" position wherein nominal fluid flow is allowed.
Figure 15:
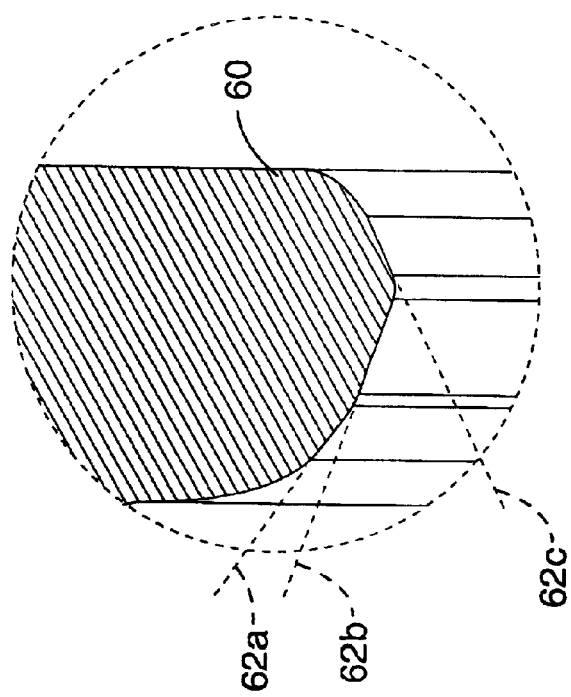
FIG. 15 is a detailed cross-section of the valve seat shown in FIG. 14 wherein the accurate beveling of the valve seat according to an aspect of the present invention enhances shut-off valve operation.
Figure 14:
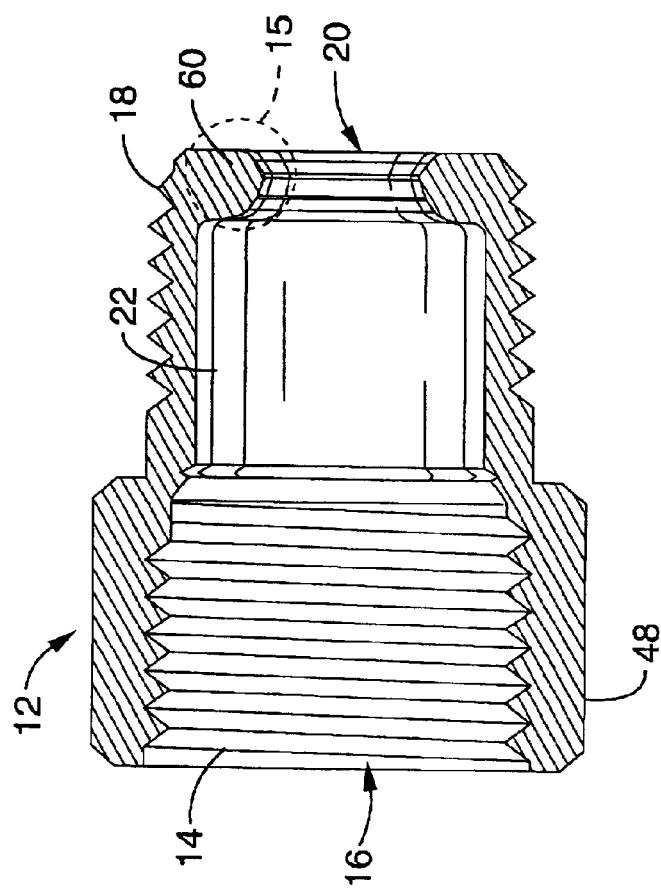
FIG. 14 is a cross-section of the valve body of FIG. 13, showing the valve chamber and seat.

FIG. 13, FIG. 14, and FIG. 15 depict a combination surge suppressor and shut-off valve utilizing the short poppet style shown in FIG. 11 and FIG. 12. The shut-off valve is shown in an open position with poppet 24 biased by biasing member 44, coiled spring, against retention member 46, such as a retention ring as shown, which is retained within the valve body by a retention groove 56 within valve chamber 22. FIG. 14 illustrates a cross section of valve chamber 22 within valve body 12. Fluid flow through poppet 24 in valve chamber 22 can take either a normal flow path wherein nominal fluid flow may be established, or a bypass flow path wherein a very low flow equalization flow path is maintained. The normal flow path is from inlet port 16 into recessed region 36 in poppet base 26 and through apertures 28, referred to generally as bores, which allow fluid to flow through the poppet and to exit at outlet port 20. Bypass flow enters recessed region 36 and the bypass passageway 38 which is optionally configured with a bypass flow restriction 40 and a bypass flow output 42, which preferably provides a conical output section that directs fluid flow toward outlet port 20. The passageway may be alternately configured in other ways, such as by creating a passageway having a small cross-sectional area wherein flow restriction 40 is not necessary, however, the use of a restriction simplifies accurately controlling bypass flow. By way of example, the diameter of the flow restricted passageway 40 is five to twenty five mils, or a combination of apertures having a similar cross-sectional area.

As shown in the figure, the normal flow path is available because an annular separation exists between valve seat interface 58 of poppet 24 and valve seat 60 that circumscribes the fluid flow opening of outlet port 20. In the embodiment shown, the exterior surface of the head of poppet 24 has a single beveled arcuate section 54 that directly corresponds to bevel 62a of the valve seat, shown in a detailed view in FIG. 15. Additional bevels 62b, 62c provide for controlling the flow of fluid through valve body 12. The junction between each bevel is radiused to allow for smooth flow through the valve. In general one of the facets contacts the surface of the poppet while the remaining facets operate to smooth the transitional flow about the head of the poppet.

The flow dynamics around and through poppet 24 are important for providing accurate operation thresholding, low open-state flow restriction, and reliable operation. A bypass passageway 38, which may also be referred to as a central bore, is present in poppet 24 to provide a small gas bypass that allows pressure across the valve to equalize and thereby effects automatically resetting of the valve. The flow through bypass passageway 38 is optionally controlled by a bypass flow restriction 40 to limit the bypass fluid flow. The restriction shown for a one-half inch gas pipe has a bypass restriction comprising a hole having a diameter preferably in the range from 0.002 to 0.050 inches, and more preferably between approximately 0.001 and 0.030 inches, and most preferably approximately 0.015 inches. It will be appreciated the shut-off valves configured for higher viscosity fluids will typically utilize larger bypass flow passages for a given pressure. The combination of bypass passageways provide for fluid flow through poppet 24 and valve body 12, despite valve state, and can be referred to as a bypass port. A bypass port may be alternatively implemented in a number of ways, included provided at the interface between poppet 24 and valve seat 60 so that gas continues to flow at a minimum rate even when poppet 24 fully engages valve seat 60. The cross sectional area and flow design of the bypass port are implemented according to the given application, which is primarily determined by the pressure of the source in the gas delivery system and the load demand of the intended installation.

Flow apertures 28 (bores) through which nominal open state valve flow is directed, are preferably provided in a circumferential pattern about base 26 of poppet 24. Each flow aperture 28 (bore) is preferably chamfered on the upstream side (toward the inlet) of poppet 24 for collecting flow from the inlet port and directing that flow at the output of base 26 to travel around the neck 32 and head 34 of poppet 24 toward valve outlet port 20. Poppet 24 is preferably manufactured from a material that exhibits a lubricious quality, and which permits an even laminar flow to develop when the valve is in the "on" state. Flow apertures 28 control the flow of gas by allowing only a measured amount of gas through the base of the poppet and out of valve.

After the gas has passed through flow apertures 28, it reaches the area in valve chamber 22 between base 26, neck 32, and head 34, where laminar flow begins to follow neck 32. The tapered shape of neck 32 and head 34 of poppet 24 results in only a small pressure drop across the valve. The angled shape of neck 32 on poppet 24 operates to maintain flow equilibrium, and is then directed toward the outlet port 20 of the valve, which is also referred to as a discharge port. When the gas reaches head 34 of poppet 24 the angled design of the head provides the necessary flow control with respect to allowable pressure drop.

Preferably, valve interface 58 of poppet 24 and the valve seat 60 within valve chamber 22 of valve body 12 are engineered to engage one another at precise angles to form a seal. In addition, the angle and radius of valve seat 60 in valve body 12 are preferably developed to limit the amount of pressure drop which occurs under conditions of nominal rated flow for the shut-off valve in its "on" state. The angle and finish of poppet 24 are preferably held to the tight tolerances in order to achieve the desired seating while maintaining integrity of pressure drop. Poppet 24 is designed for a particular application to allow a predetermined flow of gas at a given operating pressure differential. However, poppet 24 under a sufficient pressure differential moves to shut off the fluid flow through the shut-off valve.

A critical function of poppet 24 is to form a seal and prevent gas from migrating downstream from the valve and takes place at the down stream segment. Thus, it will be seen that the poppet will allow a predetermined flow of gas to pass through the valve in the opened position and will prevent the downstream flow of gas in the closed position. In the closed position, the poppet will remain seated against the valve seat while it allows for minimum bypass.

Figure 16:
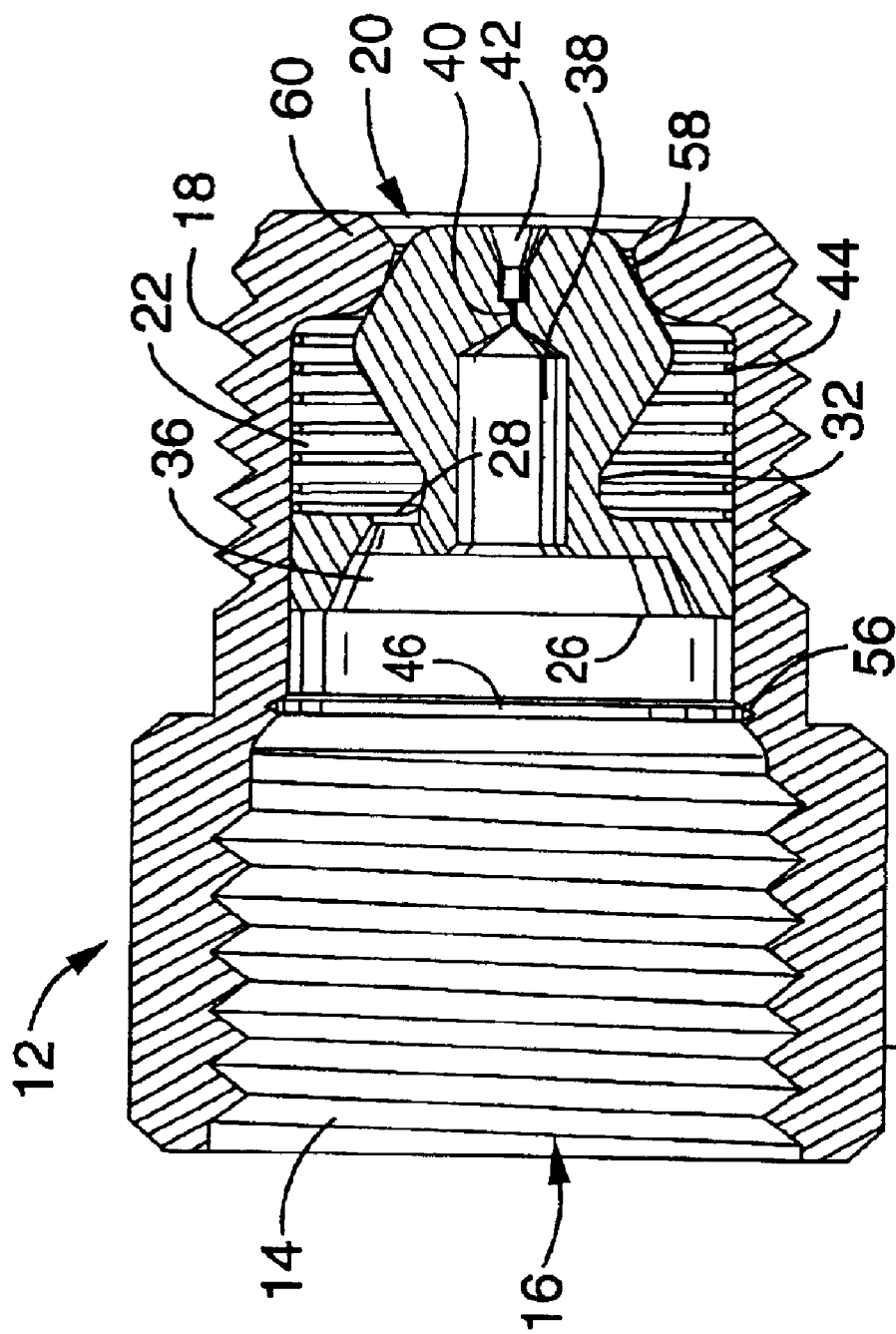
FIG. 16 is a cross-section of the combination surge suppression and safety shutoff valve of FIG. 16, depicting the valve in an "off" position wherein flow is restricted to bypass flow only.

FIG. 16 illustrates the shut-off valve 10 in a closed position which is attained automatically in response to a sufficient pressure differential across the valve, specifically when inlet pressure exceeds the outlet pressure by an amount determined by the application for which the particular valve is designed. It will be appreciated that a large range of activation thresholds may be implemented for a range of applications by varying spring tensions, flow apertures, poppet weight, and other fluid flow related aspects of the valve. In the closed position, the only flow across shut-off valve 10 is by way of flow bypass through the center of poppet 24. The bypass flow allows pressure to equalize across the shut-off valve wherein the valve automatically resets to an open position after a surge or the repair of a rupture in the downstream flow.

Figure 17:
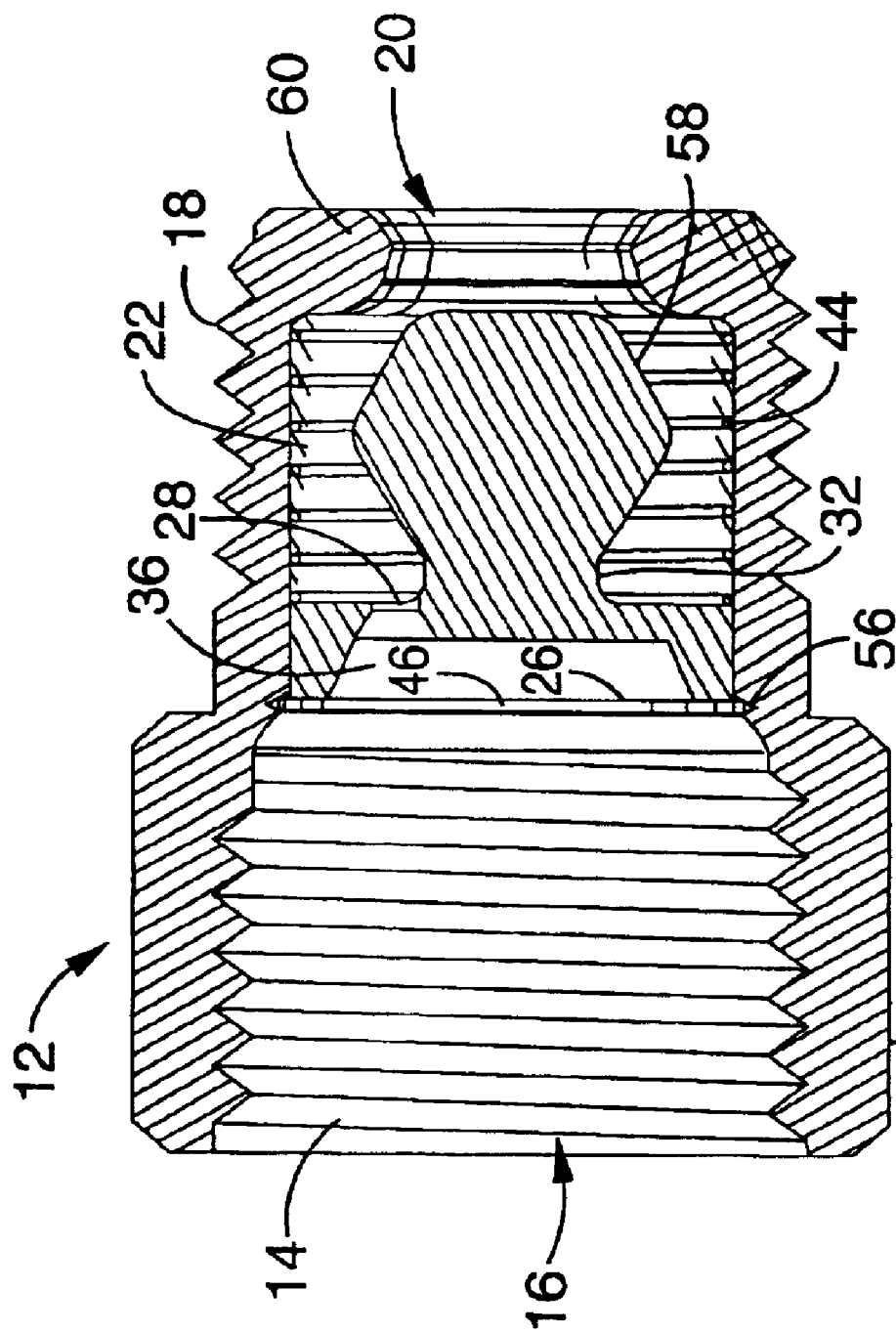
FIG. 17 is a cross-section of an alternate embodiment of the combination surge suppression and safety shut-off valve, shown without an internal bypass port for allowing automatic resetting of the safety shut-off valve according to an aspect of the present invention.

FIG. 17 depicts a combination surge suppression and safety shut-off valve according to the present invention which lacks the inherent ability to automatically reset itself to an "on" state after entering an "off" state as a result of a pressure differential between the inlet and outlet ends of the shut-off valve. It will be appreciated that by eliminating the bypass passageways, previously depicted as series passageways 38, 40, 42, a surge suppression and shut-off valve is created that retains the benefits of the present invention, albeit lacking the automatic reset capability. It will be further appreciated that a manual bypass, such as a push-button valve, or other manually operated fluidic valve may be incorporated within the shut-off valve, or utilized in conjunction with, a non-automatic shut-off valve according to the present invention to provide a method for resetting the valve manually. Alternatively, the upstream flow may be shut-off manually and the pressure in the section between the shut-off valve and the combination surge suppressor and shut-off valve bled until pressure equalizes.

It should also be appreciated that alternative embodiments of the present invention may be easily implemented by one of ordinary skill in the art for use in a variety of applications and forms of fluidic distribution systems. For example, the design of the poppet may be changed, separately or in combination with the design of the valve body, to support differing pressure characteristics, nominal flow rates, bypass flow rates, and surge suppression characteristics such as timing.

Figure 18:
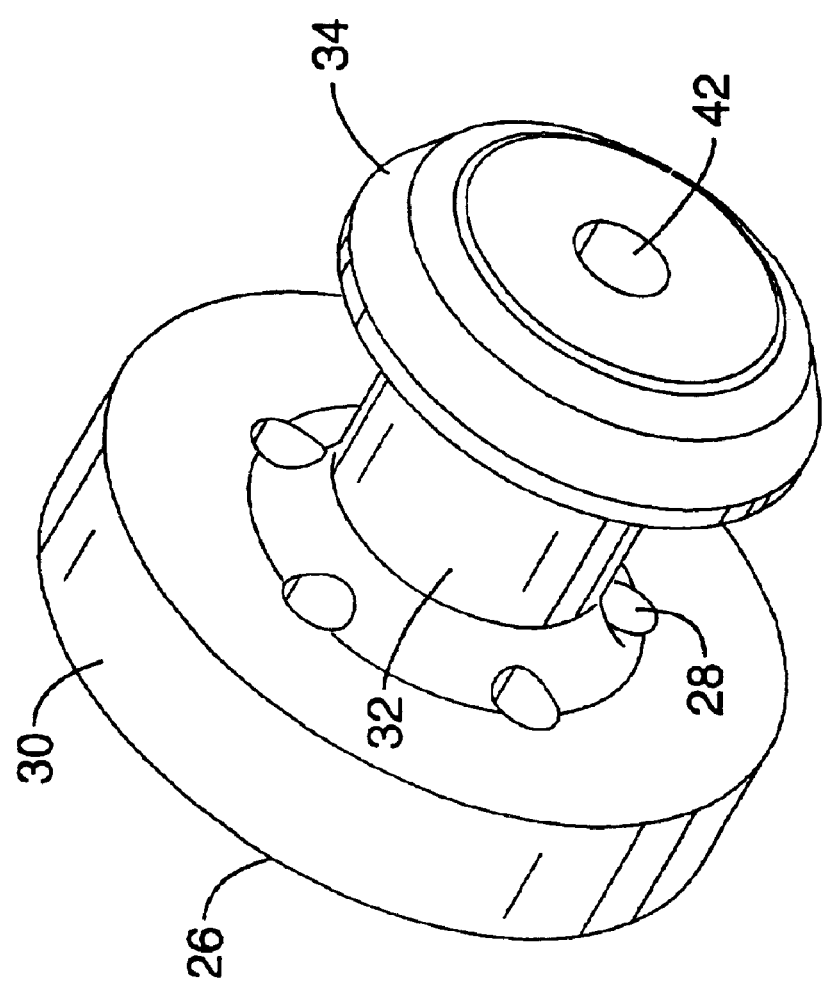
FIG. 18 is a perspective view of an alternate poppet embodiment according to an aspect of the present invention, shown with a mushroom-shaped poppet head.
Figure 20:
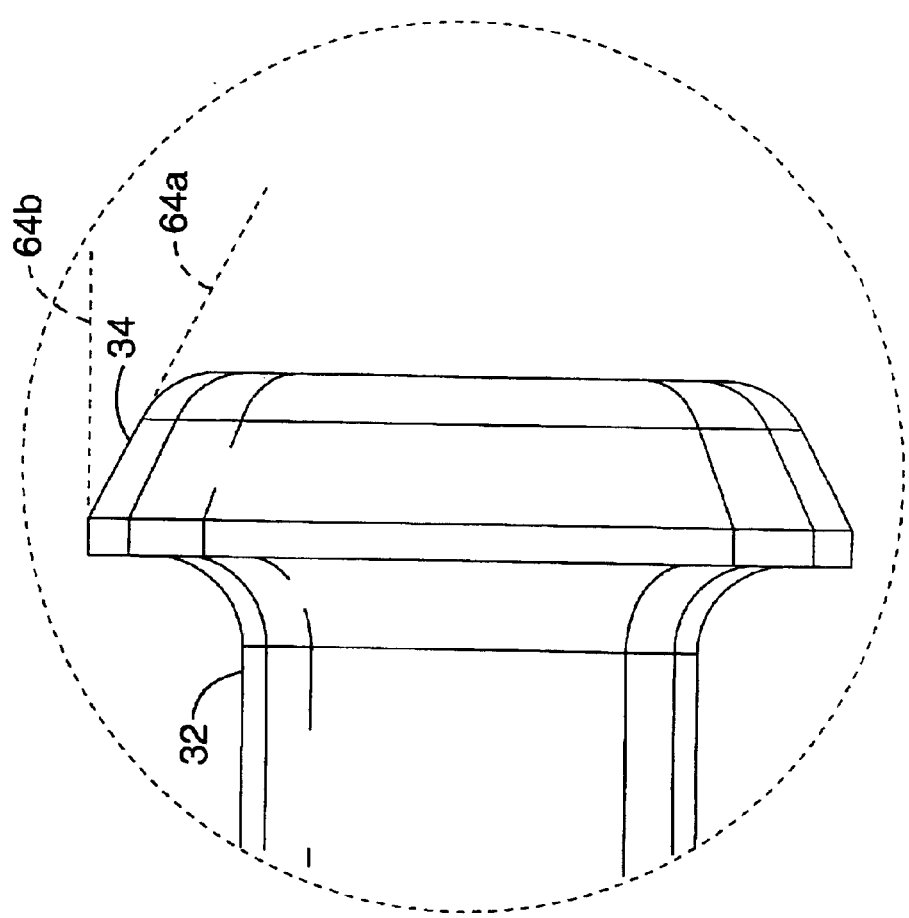
FIG. 20 is a detailed view of the distal end, valve seat engaging interface, of the poppet embodiment of FIG. 19.
Figure 19:
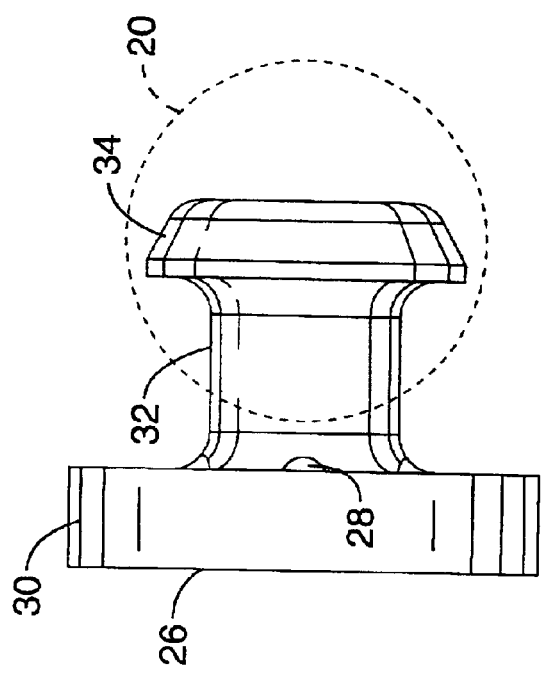
FIG. 19 is a side view of the poppet embodiment of FIG. 18.

FIG. 18, FIG. 19, and FIG. 20 illustrate an alternative poppet 24 having a cap-shaped head section 34 that does not provide the laminar flow of the prior poppets shown, however, it increases the effective reservoir area within valve chamber 22. A dual bevel 64a, 64b is shown with bevel 64a at an angle to interface with the valve seat while bevel 64b reduces the nominal flow restriction of the poppet.

Figure 21:
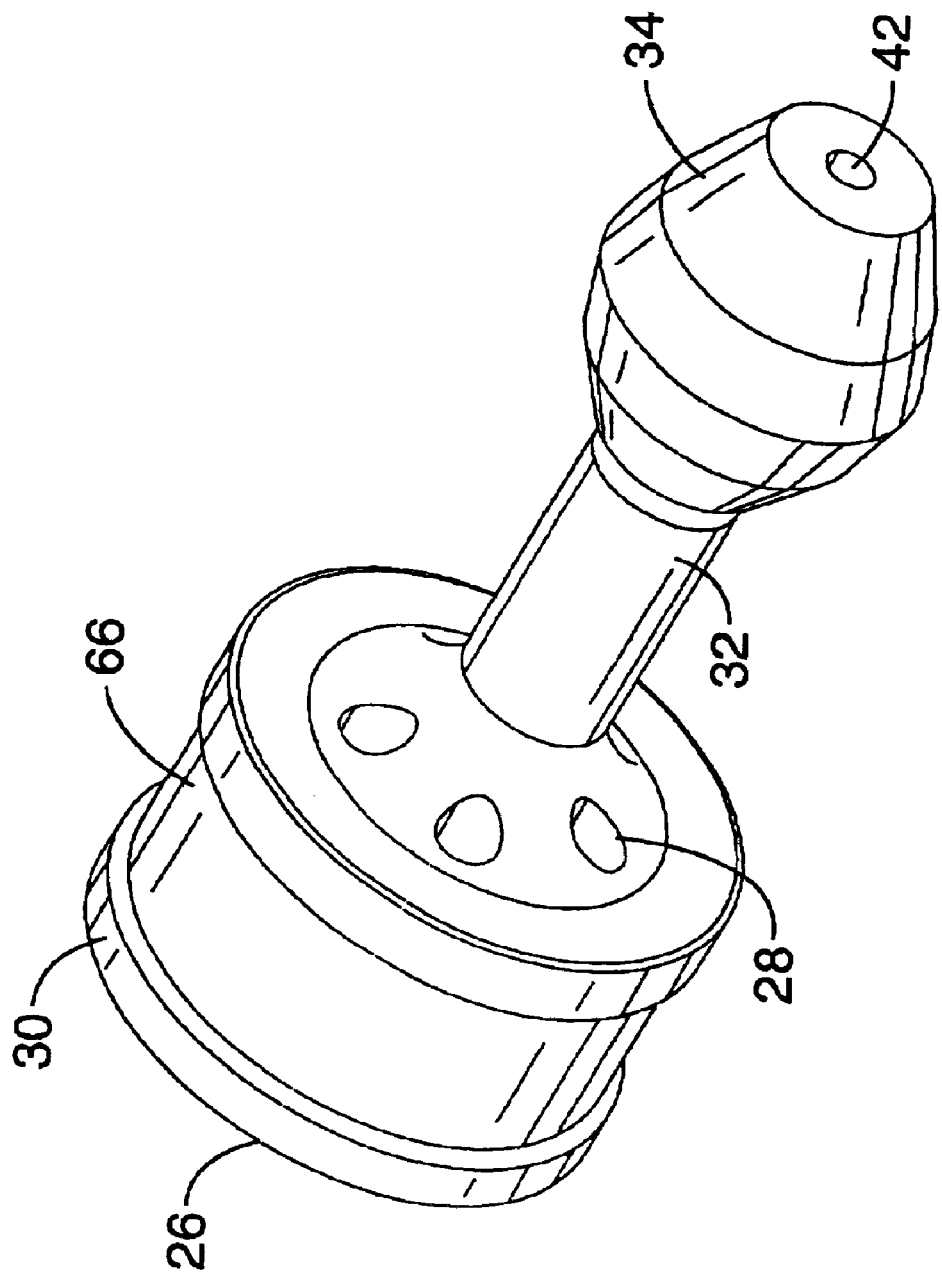
FIG. 21 is a perspective view of another poppet embodiment according to an aspect of the present invention, shown with a substantially extended neck, flow conforming head, and a deeply recessed base.
Figure 22:
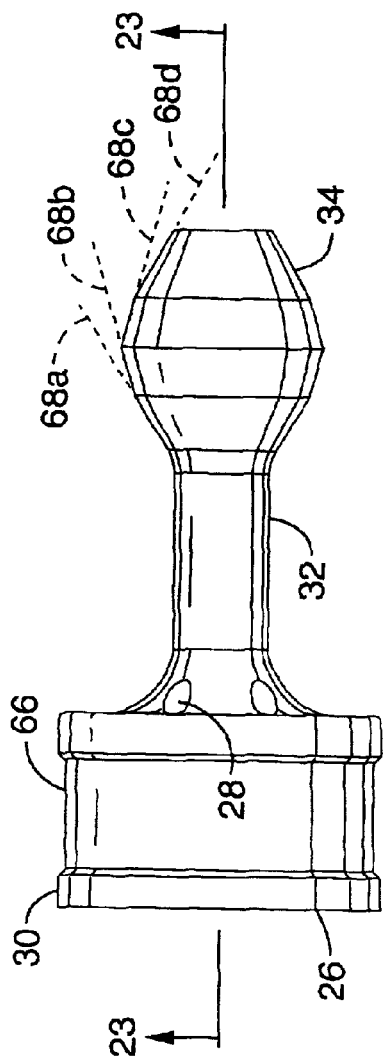
FIG. 22 is a side view of the poppet embodiment shown in FIG. 21, showing the deep base region with perimeter recess, extended neck, and beveling of the head according to an aspect of the present invention.
Figure 23:
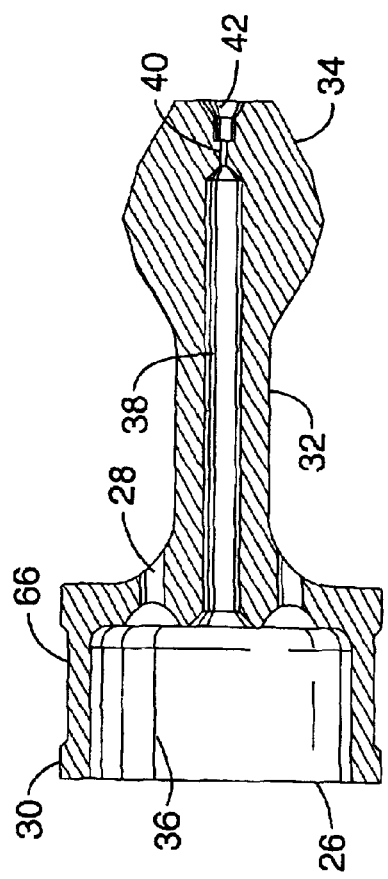
FIG. 23 is a cross-section of the poppet embodiment shown in FIG. 22, taken through the lines 23—23.
Figure 24:
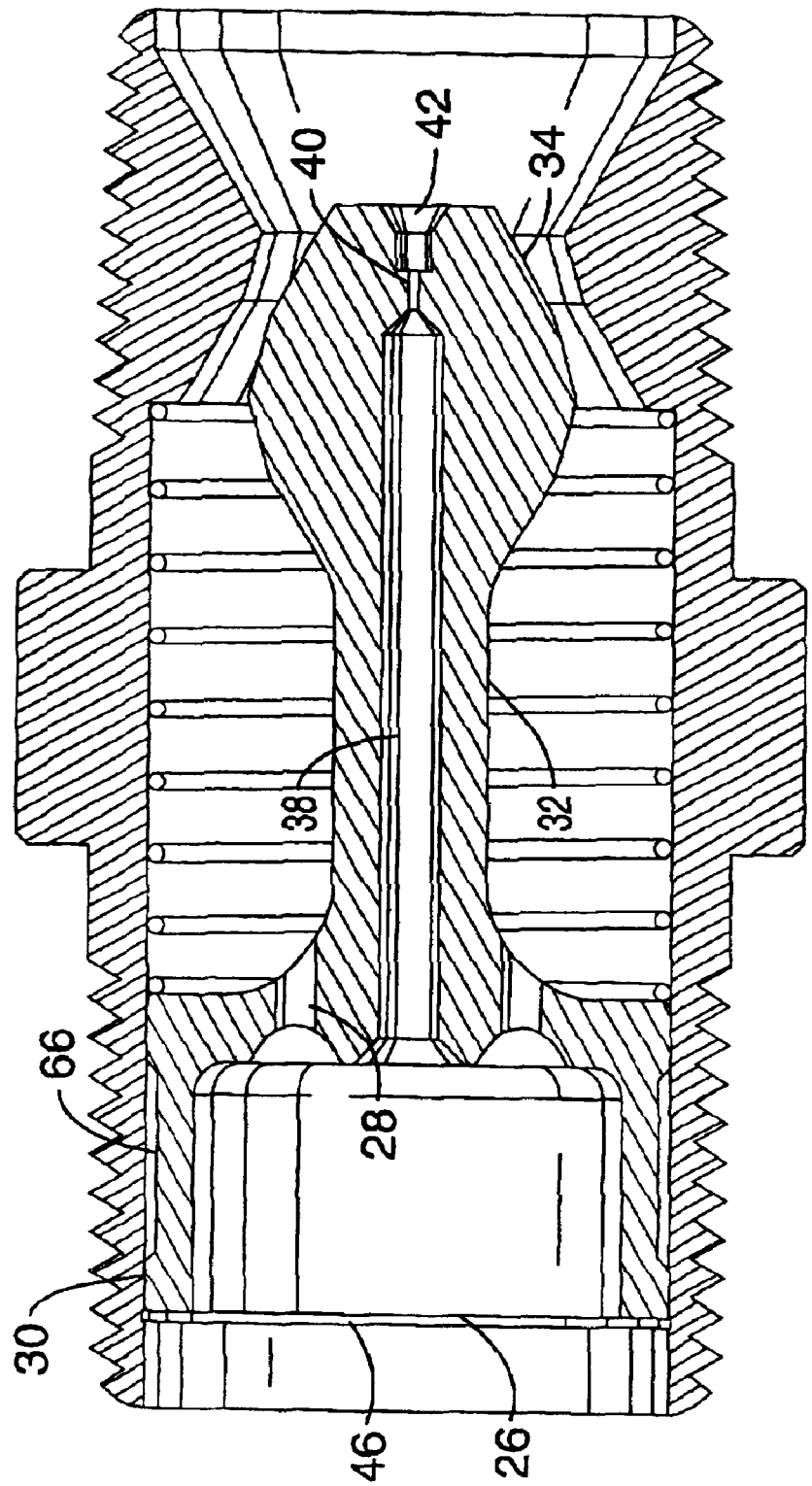
FIG. 24 is a cross-section view of the safety shut-off valve utilizing the poppet shown in FIG. 23, shown slidably disposed within the interior of a male-male valve body along with a bias spring according to an embodiment of the present invention.
Figure 25:
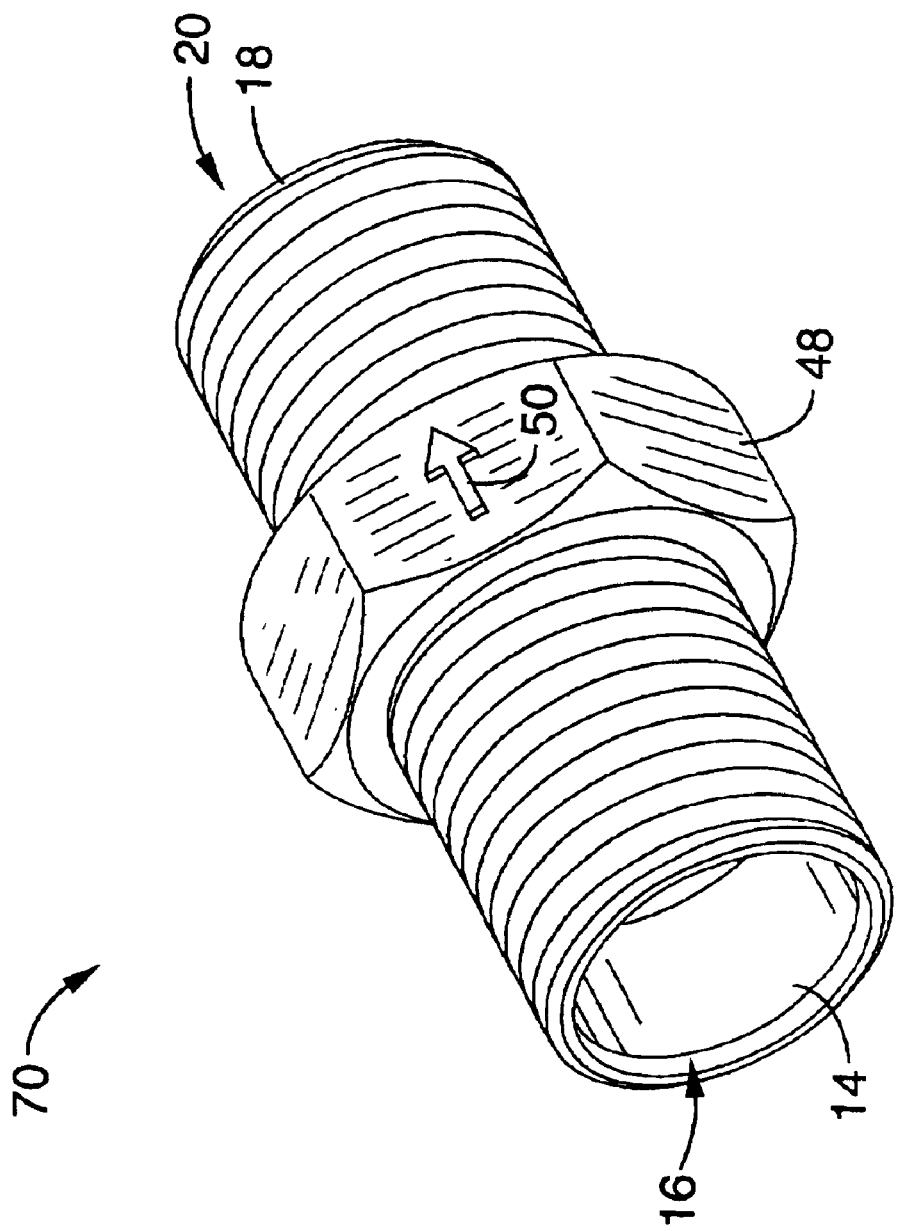
FIG. 25 is a perspective view of the male-male combination surge suppressor and safety shut-off valve of FIG. 24.

FIG. 21, FIG. 22, and FIG. 23 illustrate a long poppet 24 embodiment wherein base 26 as well as neck 32 are extended and head 34 generally has an ellipsoid cross-section as compared with the other poppets shown. Base 26 is further adapted with a recess 66 to reduce sliding friction with valve chamber 22. The design of elongated neck 32 and head 34 provide for a less turbulent laminar flow through the valve chamber around the poppet which reduces the pressure drop across the valve under normal operation. Head 34 is shown with four bevels 68a–68d and radiusing therebetween to maintain smooth flow through the valve. This long poppet 24 embodiment would typically be preferred within larger pipe diameters, such as one-inch gas pipes, and pipes otherwise having a high nominal flow velocity. FIG. 24 and FIG. 25 depict a shut-off valve 70 wherein elongated poppet 24 is retained in a valve body 12 whose connectors are configured with the same connection styles, in this case threaded male pipe ends.

Accordingly, it will be seen that this invention provides a combination fluid flow surge suppressor and automatic shut-off valve that in a preferred embodiment also provides for automatic resetting back to nominal flow state. It will be appreciated that although various implementations of poppets and valve bodies have been shown, that a person of ordinary skill in the art may implement a number of variations thereof without departing from the present invention. Furthermore, the flow bypass described may be implemented within the shut-off valve by various means, a few of which were described herein. It should also be appreciated that the teachings of the present invention are applicable to gas distribution and less preferably to a wide variety of fluid flow shut-off valves in a number of fluid distribution system applications without departing from the teachings of the present invention.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A surge suppressor/shut-off valve apparatus, comprising:

a valve body;

said valve body having an inlet port and an outlet port;

flow restricting means associated with said valve body for reducing the flow rate of a fluidic material between said inlet and outlet ports from a first, nominal flow rate, to a second, reduce flow rate, when a pressure differential between said inlet and outlet ports is exceeded;

wherein said flow restricting means comprises a poppet member slidably disposed within said valve body, a valve seat positioned within said valve body, and a biasing member positioned within said valve body;

wherein movement of said poppet member within said valve body will reduce the flow rate of a fluidic material between said inlet and outlet ports from said first, nominal flow rate, to said second, reduced flow rate, when a pressure differential between said inlet and outlet ports is exceeded, and wherein said biasing normally member urges said poppet member away from said valve seat for flow at said first flow rate;

wherein said poppet member comprises a base portion slidably engaging said valve body, a shaft or neck portion centrally disposed on said base, and a valve seat interface portion said shaft adapted to interface with said valve seat;

wherein openings are defined on said base portion;

wherein said openings on said base portion are chamfered; and wherein said first flow rate is automatically restored when the fluidic pressure at said outlet port is increased until said pressure differential is no longer exceeded.

2. A surge suppressor/shut-off valve apparatus, comprising:

a valve body;

said valve body having an inlet port and an outlet port;

a valve seat positioned within said valve body; and a biasing member positioned within said valve body;

a poppet member slidably disposed within said valve body;

wherein movement of said poppet member within said valve body will reduce the flow rate of a fluidic material between said inlet and outlet ports from a first, nominal flow rate, to a second, reduced flow rate, when a pressure differential between said inlet and outlet ports is exceeded;

wherein said biasing member urges said poppet member away from said valve seat for flow at said first flow rate;

wherein said poppet member comprises a base portion slidably engaging said valve body, a shaft or neck portion centrally disposed on said base, and a valve seat interface portion on said shaft adapted to interface with said valve seat;

wherein openings are defined on said base portion;

wherein said openings on said base portion are chamfered, and wherein said second reduced flow rate is maintained until said pressure differential is no longer exceeded.

3. A surge suppressor/shut-off valve apparatus, comprising:

a valve body;

said valve body having an inlet part and an outlet port;

a valve seat positioned within said valve body; and a biasing member positioned within said valve body;

a poppet member slidably disposed within said valve body;

wherein movement of said poppet member within said valve body will reduce the flow rate of a fluidic material between said inlet and outlet parts from a first, nominal flow rate, to a second, reduced flow rate, when a pressure differential between said inlet and outlet ports is exceeded;

wherein said biasing member urges said poppet member away from said valve seat for flow at said first flow rate;

wherein said poppet member comprises a base portion slidably engaging said valve body, a shaft or neck portion centrally disposed on said base, and a valve seat interface portion on said shaft adapted to interface with said valve seat;

wherein openings are defined on said base portion;

wherein said openings on said base portion are chamfered; and wherein said first flow rate is automatically restored when the fluidic pressure at said outlet port is increased until said pressure differential is no longer exceeded.

4. An apparatus as recited in claim 1, 2 or 3, further comprising:

a retaining clip disposed within said valve body;

wherein movement of said poppet member away from said valve seat is limited.

5. An apparatus as recited in claim 4, further comprising a groove within said valve body for receiving said retaining clip.

6. An apparatus as recited in claim 5, further comprising:

a bypass port in said poppet;

wherein said bypass port is configured to provide equalization of pressure differential across said apparatus and facilitate automatic reset of said apparatus to an "on" position upon a sufficient reduction in said pressure differential.

7. An apparatus as recited in claim 6, wherein the maximum flow rate through said bypass port is limited to a range from approximately 0.001 SCFH to approximately 10 SCFH.

8. An apparatus as recited in claim 6:

wherein said bypass port comprises a passageway through the length of said poppet member toward said valve seat; and wherein said bypass port establishes a fluid communication path between said input port and said output port irrespective of the position of said poppet member in relation to said valve seat.

9. An apparatus as recited in claim 1, 2 or 3, wherein said base portion includes a recess.

10. An apparatus as recited in claim 1, 2 or 3:

wherein said valve seat interface portion comprises an enlarged portion with a generally rounded terminal, distal, end for engaging said valve seat;

said valve seat interface portion tapering toward a proximal end of said shaft.

11. An apparatus as recited in claim 1, 2 or 3, wherein said biasing member comprises a spring.

12. An apparatus as recited in claim 11, wherein said spring is coiled within said valve body surrounding said poppet member.

* * * * *